United States Patent
Poling, Sr. et al.

(10) Patent No.: US 7,140,242 B1
(45) Date of Patent: Nov. 28, 2006

(54) LATERAL LOAD TIRE TESTING SYSTEM

(75) Inventors: David Poling, Sr., Akron, OH (US); Richard L. Delmoro, Tallmadge, OH (US); David P. Krause, Hartville, OH (US); Alexander Hasbach, Akron, OH (US)

(73) Assignee: Akron Special Machinery, Akron, OH (US)

( * ) Notice: Subject to any disclaimer, the term of this patent is extended or adjusted under 35 U.S.C. 154(b) by 155 days.

(21) Appl. No.: 10/897,795

(22) Filed: Jul. 22, 2004

(51) Int. Cl.
*E01C 23/02* (2006.01)

(52) U.S. Cl. .................................................. 73/146

(58) Field of Classification Search ........ 73/146–146.8
See application file for complete search history.

(56) References Cited

U.S. PATENT DOCUMENTS

| | | | | |
|---|---|---|---|---|
| 4,233,838 A | * | 11/1980 | Stiebel | 73/146 |
| 4,969,355 A | * | 11/1990 | Doi et al. | 73/146 |
| 5,014,551 A | * | 5/1991 | Beebe et al. | 73/146 |
| 5,864,053 A | * | 1/1999 | Nozaki | 73/11.07 |
| 6,138,505 A | * | 10/2000 | Miyazaki | 73/146 |
| 6,581,448 B1 | * | 6/2003 | Kimbara et al. | 73/146 |
| 6,772,626 B1 | * | 8/2004 | Engel et al. | 73/146 |

FOREIGN PATENT DOCUMENTS

EP          1 300 665 A2    9/2002

OTHER PUBLICATIONS

Form PCT/ISA/220—Notification of Transmittal of the International Search Report and the Written Opinion of the International Searching Authority—Nov. 25, 2005.

* cited by examiner

*Primary Examiner*—Max Noori
(74) *Attorney, Agent, or Firm*—Renner, Kenner, Greive, Bobak, Taylor & Weber

(57) ABSTRACT

A lateral load testing system for testing a tire mounted on a rotatable spindle, the tire tester including a load assembly, a spindle frame having a support extending therefrom, a spindle housing defining a spindle bore adapted to rotatably receive the spindle, the spindle housing having a support opposite the support on the spindle frame, and a load cell located between the supports, where each support is attached to the load cell. The load cell is in electrical communication with a controller. The spindle frame is moveable to cause the tire to engage the load assembly, whereby lateral forces generated between the load wheel and tire are measured by the load cell and communicated to the controller.

12 Claims, 6 Drawing Sheets

LATERAL LOAD TIRE TESTING SYSTEM

RELATED PATENT APPLICATIONS

None.

TECHNICAL FIELD

In general, the present invention relates to a tire testing machine. In particular, the present invention relates to a tire testing machine that measures lateral forces on a tire during simulated operating conditions including steering and camber of the tire.

BACKGROUND OF THE INVENTION

Tire testing machines are used to measure forces generated between a tire and a testing surface, which often is a rotating wheel or drum, to evaluate tire performance, failure and endurance. While these machines are often used to evaluate uniformity of the tire, they may also be used to simulate road conditions and test reaction forces at the tire. For example, tire testing machines have been developed to measure lateral forces on the tire generated by steering and camber of the tire. These machines are useful in evaluating steering, camber, belt edge separation, and slip angle characteristics of the tire, among others.

Existing devices that measure lateral forces require complex calibration making it difficult to obtain reliable results in a consistent fashion. In particular, one existing design includes a tire mounted on a spindle that is rotatable within a bearing. Lubricating pockets are provided all along the length of the bearing to maintain the lubricating film. A load cell is provided around the spindle and measure variations in the loads created within the film. Changes in the film thickness resulting from operation of the testing machine and friction within the bearing causes errors in the forces read by the load cell. The presence of the lubrication pockets inherently causes changes in the film thickness along the length of the bearing and, thus, complex equations have been developed to eliminate these errors and attempt to ascertain a true force from the load cells. While meaningful measurements can be taken with this machine, zeroing of the machine to eliminate the aforementioned errors is time consuming and complicated.

Another known system, referred to as a "piezo-quartz" system, uses piezo-electric gauges to measure loads. In this design the piezo gauges are located around the spindle hub. Since the piezo-electric response requires periodic release of force on the cell to allow it to recharge, the system is not practical for long term force measurements. Also, for a given load, since the system's signal deteriorates with time. As a result of this drift, the piezo quartz system lacks the precision necessary for many testing applications. Consequently, there is a need for a simpler, more reliable lateral force tire testing machine.

SUMMARY OF THE INVENTION

In view of the foregoing, it is one object of the present invention to provide a more reliable lateral force tire testing machine.

It is another object of the present invention to provide a lateral force tire testing machine that includes a movable spindle assembly frame supported by load cells mounted to a rigid stationary frame.

In light of at least one of the foregoing objects, the present invention provides a lateral load tire testing system for testing a tire mounted on a rotatable spindle, the system including, a load assembly, a tire support assembly configured to place the tire in contact with the load assembly, wherein the tire support assembly includes a spindle frame and a spindle housing, the spindle frame having a support extending therefrom, the spindle housing defining a spindle bore adapted to rotatably receive the spindle, the spindle housing having a support opposite the support on the spindle frame, and a load cell located between and attached to the supports, the load cell being adapted to measure forces resulting from relative axial movement between the supports, the load cell being in electrical communication with a controller, whereby lateral forces are measured by the load cell and communicated to the controller.

The present invention further comprising a lateral load tire testing system for measuring lateral forces on a tire, the system includes, a load assembly engagable with the tire, a tire support assembly including, a spindle housing having a pair of first supports extending radially outward therefrom, a spindle adapted to support the tire, the spindle being rotatably supported on the spindle housing, a spindle frame having a pair of second supports extending outward therefrom opposite the first supports, wherein the first supports and second supports are coupled to each other, such that, the spindle frame supports the spindle housing yet allows the spindle housing to move axially relative to the spindle frame, and a pair of load cells supported by the first and second supports and adapted to detect forces at the tire from relative axial movement of the first and second supports.

The present invention further provides a method of measuring lateral loads on a tire including, providing a load assembly and a spindle located adjacent to the load assembly, the spindle being adapted to rotatably support the tire and selectively engage the tire with the load wheel, supporting the spindle in a spindle housing that is attached to a spindle frame yet movable axially relative thereto, and coupling a load cell to the spindle housing and spindle frame measuring axial loads generated by movement of the spindle housing relative to the spindle frame to determine lateral forces on the tire.

BRIEF DESCRIPTION OF THE DRAWINGS

For a complete understanding of the objects, techniques and structure of the invention, reference should be made to the following detailed description and accompanying drawings wherein.

DETAILED DESCRIPTION OF THE INVENTION

Figure 1:
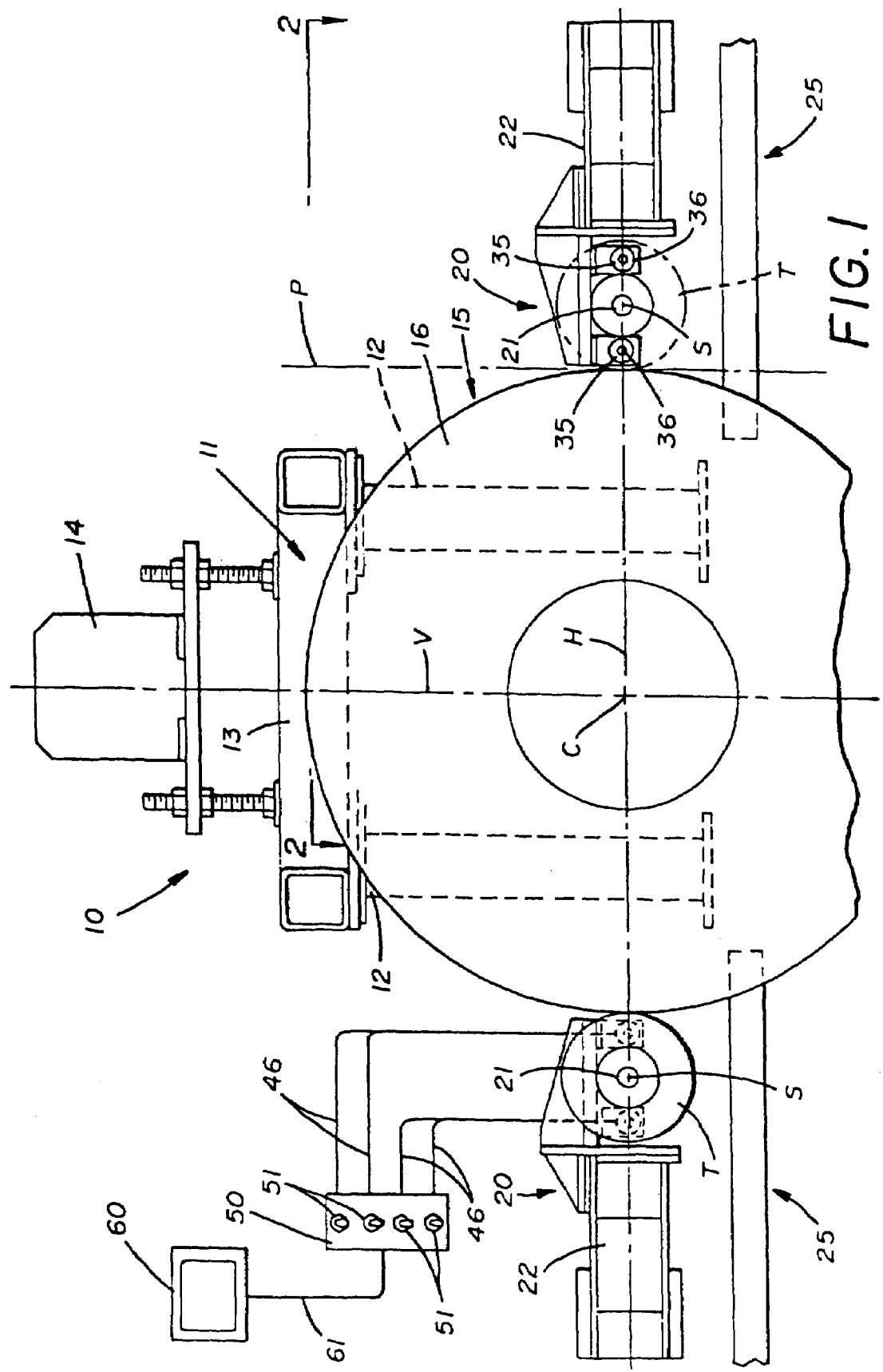
FIG. 1 is a front elevational view of a tire testing machine according to the concepts of the present invention.

With reference to FIG. 1, a lateral load tire testing system according to the concepts of the present invention is generally indicated by the numeral 10. System 10 includes a frame 11, which may include legs 12 and a header 13 that rests on top of the legs 12. A motor 14 may be supported on frame 11 to drive a load assembly, generally indicated by the numeral 15 and described more completely below. Load assembly 15 may be provided within or adjacent frame 11, and is used to apply a load to the tire T. The load assembly 15 may simply include a stationary surface, such as a plate (not shown) for applying static loads to the tire T and measuring the results of those loads. Also, as shown, a moving load assembly 15 may be used to dynamically load the tire T or simulate rolling conditions. To that end, load assembly 15 may include a rotatable load wheel 16.

In the example shown, load wheel 16 may be rotatable about a center axis C at which a vertically extending plane V and a horizontally extending plane H intersect. The motor 14 may be connected to the load wheel by a suitable coupling (not shown) or directly drive the load wheel 16 to cause its rotation. A tire support assembly, generally indicated by the numeral 20, is located radially outward of the load wheel 16 and configured to place a tire T in contact with the load assembly 15. As shown, more than one tire support assembly 20 may be used with load assembly 15 to test more than one tire T at a time. In the example shown, a pair of tire support assemblies 20 are diametrically opposed, relative to load wheel 16, and lie along the same horizontal plane H. In particular, the spindle 21 on which the tire T is mounted has a spindle center S that lies in the horizontal plane H of load wheel center C. It will also be appreciated that only a single tire support assembly 20 may be used. For sake of simplicity, the description will proceed with reference to only one tire support assembly 20.

Figure 2:
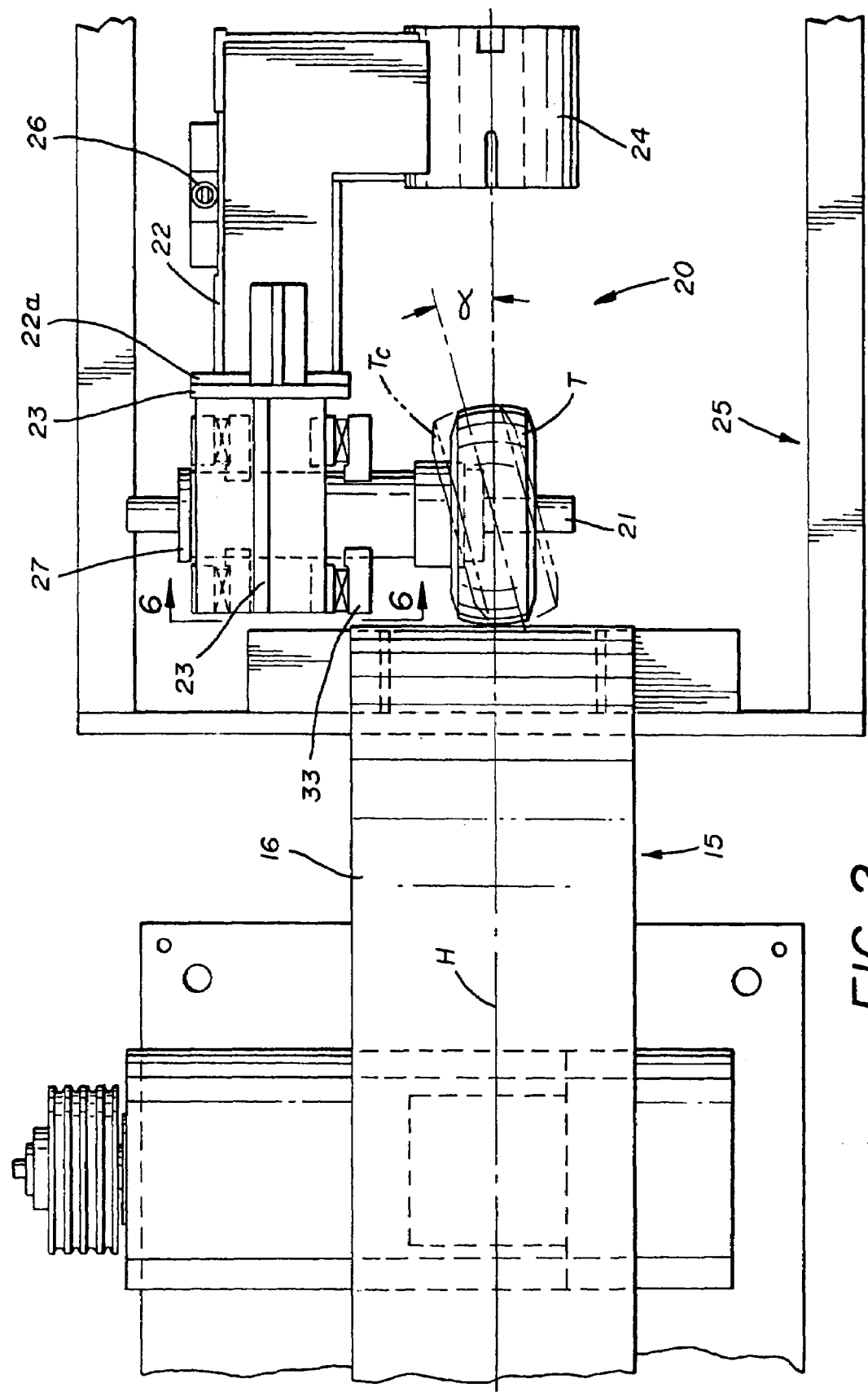
FIG. 2 is an enlarged top plan view of a tire testing machine according to the concepts of the present invention as might be seen along line 3—3 in FIG. 2.

Turning to FIG. 2, tire support assembly 20 may be mounted on a subframe, generally indicated by the numeral 25. The subframe 25 may pivot about a vertical pivot axis P that projects orthogonally from the horizontal plane H, where the tire T contacts the load wheel 16. By pivoting the subframe 25 about this point, the machine 10 can test the tire T at a selected camber angle α. For purposes of illustration, a cambered position of the tire T is depicted in broken lines in FIG. 2 and indicated by the reference letter $T_C$. While only the tire T is shown in the cambered position $T_C$, it will be appreciated that since the tire support assembly 20 is also mounted on the subframe 25, its position will rotate as well. The tire support assembly 20 may be movable inward and outward relative to the load wheel 16 to adjust the loading on the tire T and remove the tire T from contact with the load wheel 16 at the conclusion of testing.

Figure 3:
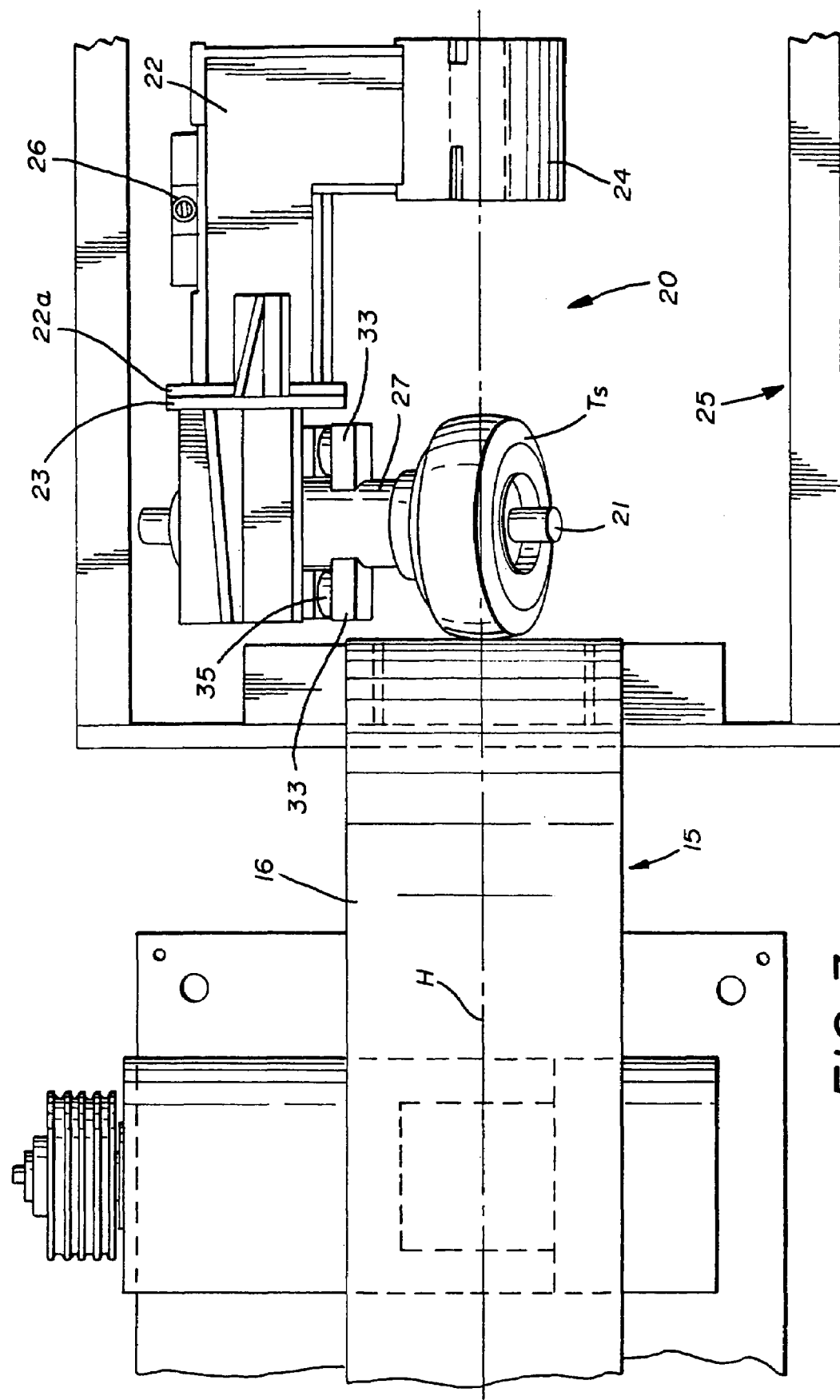
FIG. 3 is an enlarged top plan view similar to FIG. 3 showing the tire in a rotated position to simulate steering.

Tire support assembly 20 generally includes an arm 22 on which the spindle 21 is supported. Arm 22 may be made rotatable to allow variation in the slip angle of the tire T. Rotation of the tire T may be effected by any number of methods available within the art including rotation of the entire arm 22, as shown. In the example depicted in FIG. 3, the arm 22 is rotatably supported on a bearing portion 24 that rotates about an axis H extending through the center of the tire T and load wheel 16. Any known actuator may be used to cause rotation of the arm 22 including, for example, a hydraulic cylinder 26, as shown. In the example shown, hydraulic cylinder 26 is attached to the radial outward side of arm 22 relative to bearing portion 24 to provide the greatest leverage. Cylinder 26 is suitably attached to the arm 22 to allow the arm 22 to be moved through the desired slip angle range and held at a selected slip angle or reciprocated for continuous steering movements. As the tire T is loaded, any variation in the slip angle may be measured, or spindle frame 23 may be rotated to a selected position to provide a selected slip angle to measure loads for that selected slip angle. Finally, the tire T may be rotated through a selected angular range in a reciprocal fashion to perform endurance testing of the tire T under steering conditions. In each case, rotation of the tire T is about an axis extending through pivot axis P and within plane H. FIG. 3 depicts the tire T rotated to a selected slip angle position indicated by the reference letter $T_S$. It will be appreciated that the tire T may be rotated through any angular position or range, as desired by the user. Forces resulting from such movements may be measured directly at the spindle 21, as will be described more completely below.

With reference to FIGS. 1 and 2, it will be seen that a spindle housing 27 is supported on spindle frame 23. The spindle housing 27 may be generally cylindrical in form and defines a cylindrical spindle bore 28, best shown in FIG. 5. Spindle 21 is rotatably mounted within spindle bore 28. The spindle housing 27 is a movable frame that responds to the loading of the tire T, as will be described more fully below. Relative movement between the spindle housing 27 and spindle frame 23 is detected to determine the force on tire T.

Figure 5:
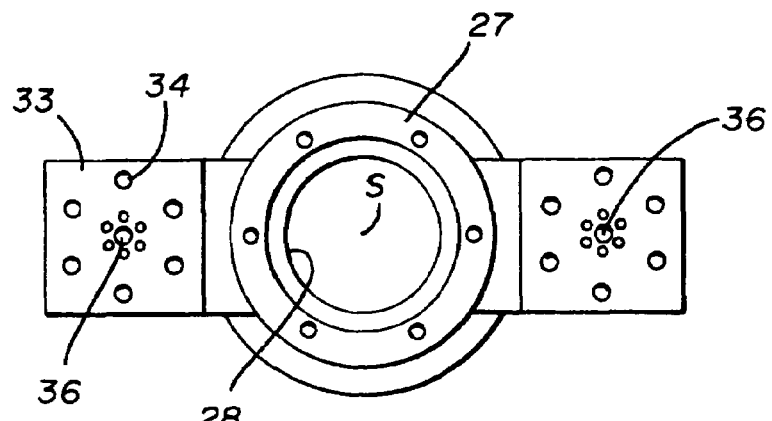
FIG. 5 is an end elevational view of the force measurement assembly as might be seen along line 5—5 in FIG. 4.

Spindle housing 27 includes a first support 33 that extends radially outward from spindle housing 27. As best shown in FIG. 5, first support 33 may be provided with fastener receivers 34 used in attaching a load cell 35 to the spindle frame 23. As shown, four first supports 33 may be provided and arranged in diametrically opposed pairs on the spindle housing 27. Supports 33 advantageously provide rigidity, stability, and unity to spindle housing 27 improving the likelihood that accurate measurements may be obtained.

As best shown in FIG. 5, the centers 36 of first supports 33 are aligned with the spindle center S of the spindle along horizontal plane H (FIG. 2). In this way, the load wheel 15, tire T, and load cells 35 all have centers aligned within horizontal plane H. By aligning these components straight line force measurements can be obtained. A second support 38 may extend downward from spindle frame 23 at a location corresponding to first support 33. As in the case of first support 33, more than one second support 38 may be provided, and be located opposite a corresponding first support 33. Thus, in the example shown, four second supports 38 are arranged in pairs opposite four first supports 33 with a load cell 35 between each pair of supports 33, 38. The second support 38 is axially spaced such that the load cell 35 is received between the first and second supports 33, 38. Supports 33, 38 are respectively attached to load cell 35, such that, supports 33, 38 are connected to each other by load cell 35. Lateral loads on tire T cause movement of spindle frame 23, which results in first support 33 moving relative to second support 38. With the load cell 35 coupled to the supports 33, 38 this movement results in a force being detected at load cell 35. In this way the lateral load is directly transmitted to the load cell 35 via the spindle housing 27 and measured by load cell 35 without the frictional influences found in prior art devices. As a result of this direct measurement, more reliable and precise force measurements are obtained.

Figure 4:
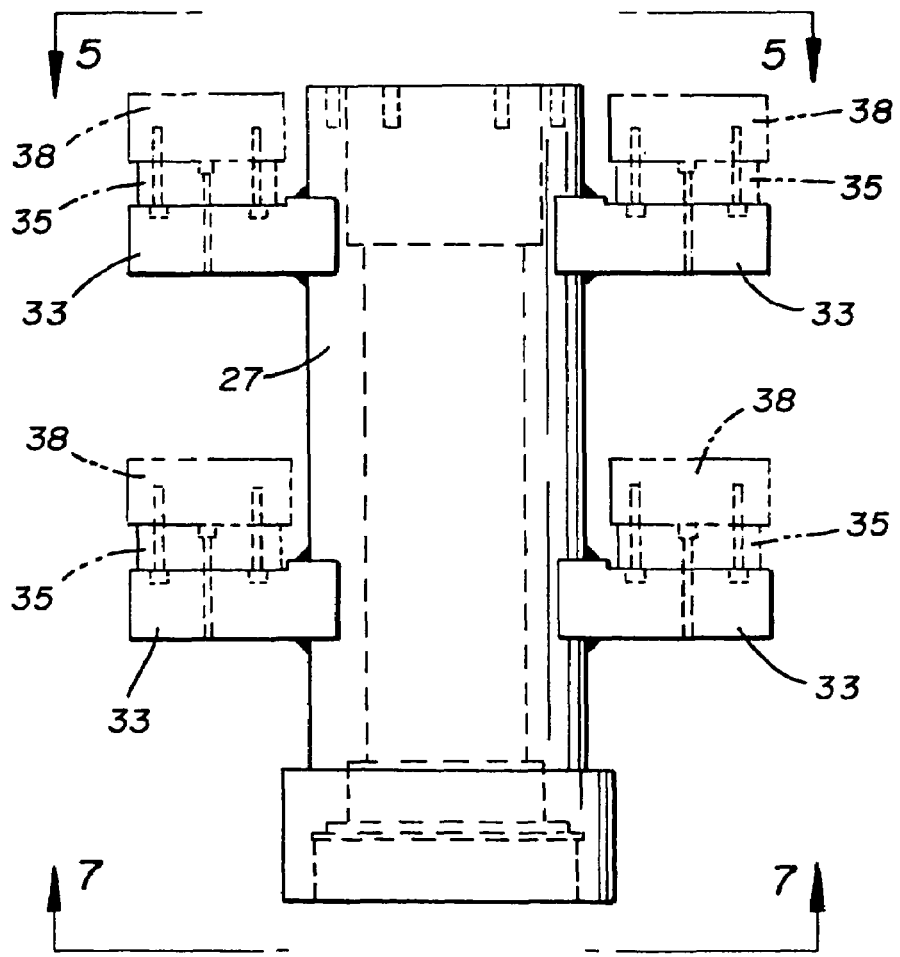
FIG. 4 is a top plan view of a force measurement assembly according to the concepts of the present invention depicting a plurality of load cells mounted on a stationary frame.
Figure 8:
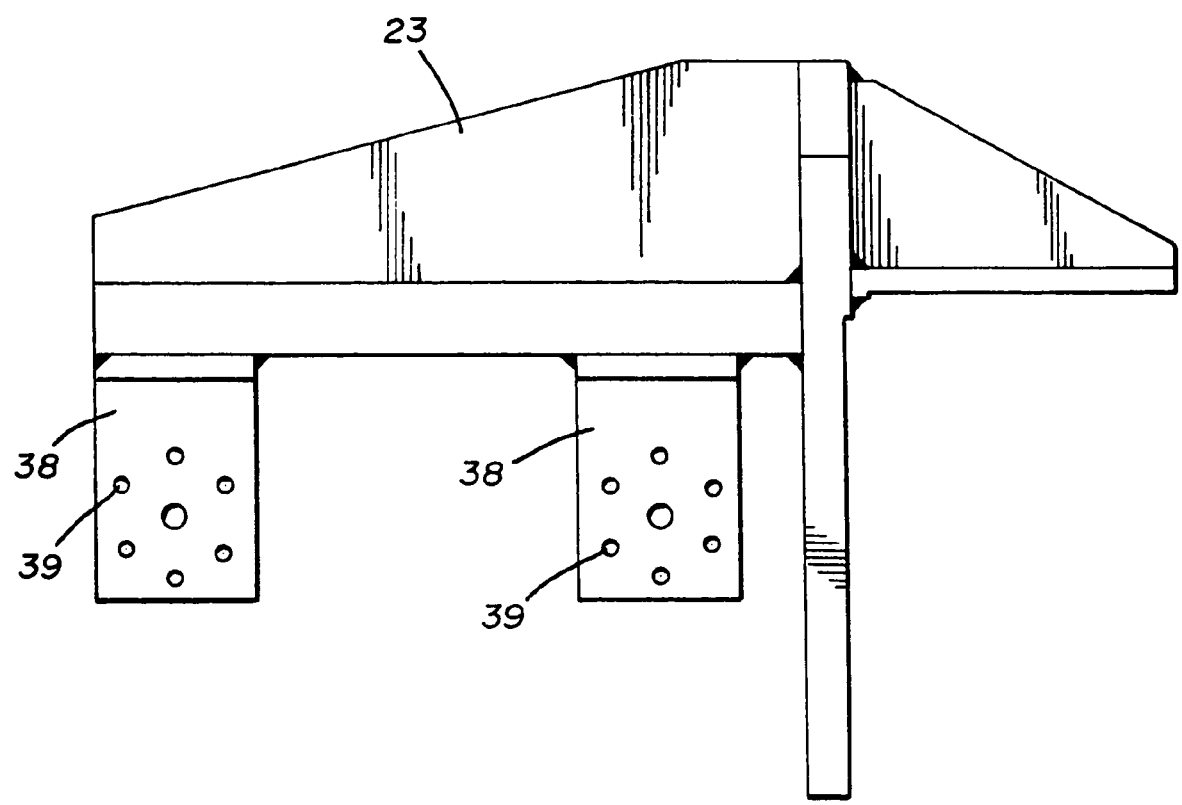
FIG. 8 is a front elevational view of a spindle support frame according to the concepts of the present invention.

As best shown in FIG. 8, second support 38 may have receivers 39 corresponding to those on the first supports 33 to facilitate the fastening of the load cells 35 thereto. As best shown in FIG. 4, suitable fasteners may run between the first and second supports 33, 38 to fasten the first and second supports 33, 38 together locking the movable spindle housing 27 to spindle frame 23. Locking the spindle housing 27 to stationary spindle frame 23 may be desirable to avoid overloading of load cells 35 during camber testing.

Supports 33, 38 are shown, for example, as having a generally rectangular form with flat inward faces 37, 39 that extend generally parallel to each other. It will be appreciated that other support configurations may be used, as well.

Figure 6:
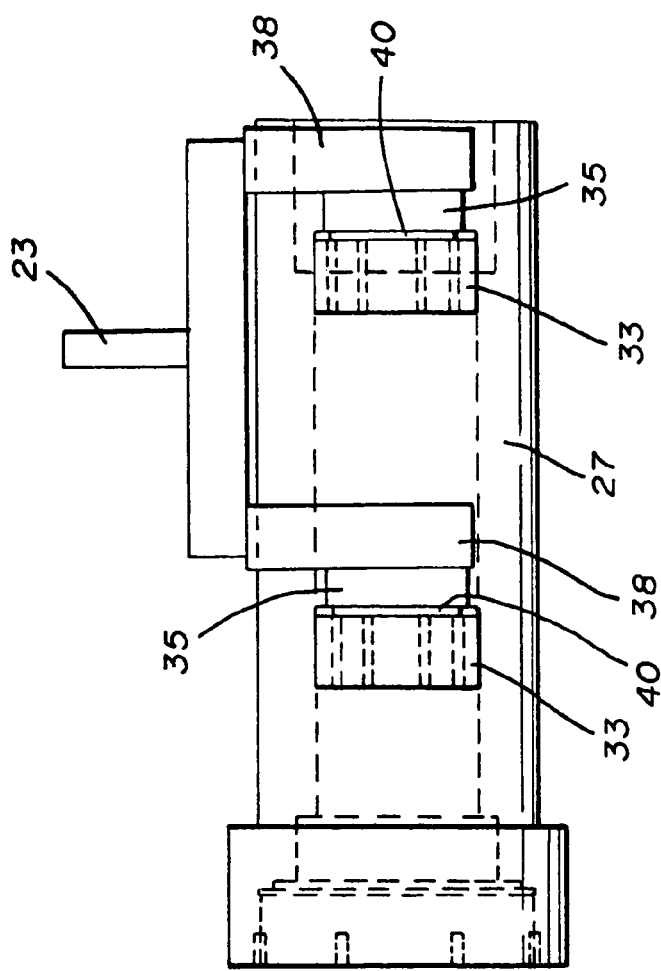
FIG. 6 is a side elevational view of the force measurement assembly as might be seen along line 6—6 in FIG. 4.
Figure 7:
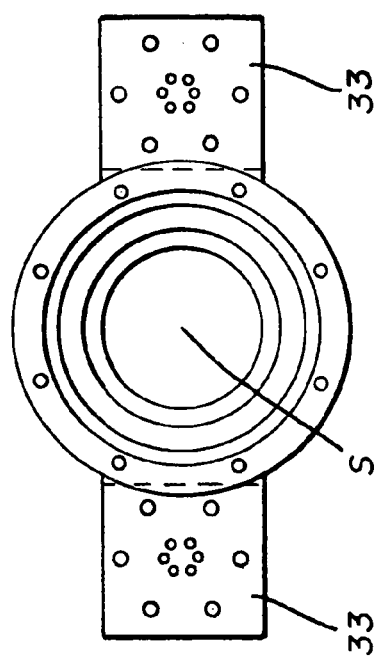
FIG. 7 is an end elevational view as might be seen along line 7—7 in FIG. 6.

With reference to FIG. 6, to ensure proper mounting of the load cells 35, spacers 40 may be attached to one or more of the supports 33, 38. In setting up the load cells 35, errant readings may be corrected by attaching a spacer 40 having a selected thickness 42 or grinding the spacer 40 until the appropriate reading is obtained.

To that end, readings from the load cells 35 may be electrically communicated along separate lines 46 to a junction box 50 that includes a switch 51 corresponding to each line 46. As shown in the given example, there are four load cells 35 having four lines 46 running to four switches 51 at junction box 50. Switches 51 may be used to separately view the signal produced by each load cell 35 to determine whether the proper support spacing has been provided or whether the load cell 35 is malfunctioning. For example, for a given load, load cells 35 each should provide the same signal. Therefore, if it is observed that one of the load cells 35 is producing a different signal, correction may be made by adjusting the spacer 40 until the load cell output matches that of the other cells. Once all of the cells have been calibrated and determined to be functioning properly, all of the switches 51 may be turned on and the signals from the load cells 35 combined and transmitted to a controller 60 along a single line 61. Alternatively each load cell signal may be directly received and monitored by controller 60. Controller 60 will be understood as generically referring to an instrument for receiving a signal from the load cell 35. Controller 60 may simply display a force reading or provide further functions useful to the user. Thus, the type of controller 60 used is largely at the user's discretion. Consequently, a generic controller 60 is schematically represent in FIG. 1.

In operation, the lateral force tire testing system 10 of the present invention may move spindle frame 23 toward load wheel 15 to pre-load the tire T before testing. The load wheel 15 is rotated causing the tire T to rotate on spindle 21. With the tire T aligned with load wheel 15 straight line performance of tire T may be observed at various speeds. To observe the tire T under steering conditions, the spindle frame 23 may be rotated about a horizontal axis to create a slip angle or steering angle, (tire $T_S$) depicted in FIG. 3. Lateral forces likely to be generated during such testing would be observed by the load cells 35. In particular, these forces would cause relative movement between spindle housing 27 and spindle frame 23. Since these components each connect to load cells 35, the relative movement would generate a corresponding force reading at load cell 35. These forces may be monitored continuously as a variety of steering conditions are made including a fixed slip angle or cyclical movement of the tire T through positive and negative slip angles measured relative to a vertical plane passing through the tire T. Also, as mentioned previously, changes in the slid angle in response to a given load may be measured. Therefore, slip angle and load measurements may be made independently of each other or combined during movement of the tire T through a range of slip angles.

Similarly, camber angle testing may be performed by rotating the tire T about a pivot axis P to a position $T_C$ (FIG. 3) relative to load wheel 15. This may be achieved by rotating the subframe 25 supporting spindle frame 23. With the camber angle α set, testing may proceed as described above. As mentioned, during camber testing, the spindle housing 27 may be locked to spindle frame 23, as by fasteners coupling supports 33, 38 to each other, to reduce the likelihood of load cell overload.

In light of the foregoing, it should thus be evident that a lateral load tire testing system according to the concepts of the present invention substantially improves the art. While, in accordance with the patent statutes, only the preferred embodiment of the present invention has been described in detail hereinabove, the present invention is not to be limited thereto or thereby. It will be appreciated that various modifications may be made to the above-described embodiment without departing from the spirit of the invention. Therefore, to appreciate the scope of the invention, reference should be made to the following claims.

What is claimed is:

1. A lateral load tire testing system for testing a tire mounted on a rotatable spindle, the system comprising:
   a load assembly;
   a tire support assembly configured to place the tire in contact with said load assembly, wherein said tire support assembly includes a spindle frame and a spindle housing, said spindle frame having a support extending therefrom;
   said spindle housing defining a spindle bore adapted to rotatably receive the spindle, said spindle housing having a support opposite said support on said spindle frame;
   a load cell located between and attached to said supports, said load cell being adapted to measure forces resulting from relative axial movement between said supports, said load cell being in electrical communication with a controller, whereby lateral forces are measured by said load cell and communicated to said controller; and
   wherein said tire support assembly is pivotable about a pivot axis extending tangentially to said load assembly at a point where the tire contacts said load assembly to create a camber angle between the tire and said load assembly.

2. A lateral load tire testing system for measuring lateral forces on a tire, the system comprising:
   a load assembly engagable with the tire;
   a tire support assembly including:
   a spindle housing having a pair of first supports extending radially outward therefrom;
   a spindle adapted to support the tire, said spindle being rotatably supported on said spindle housing;
   a spindle frame having a pair of second supports extending outward therefrom opposite said first supports;
   wherein said first supports and second supports are coupled to each other, such that, said spindle frame supports said spindle housing yet allows said spindle housing to move axially relative to said spindle frame; and
   a pair of load cells supported by said first and second supports and adapted to detect forces at said tire from relative axial movement of said first and second supports.

3. The lateral load tire testing system of claim 2, wherein said tire support assembly is rotatable about an axis exiting radially outward from said load assembly; and
   an actuator attached to said tire support assembly and adapted to selectively cause rotation thereof.

4. The lateral load tire testing system of claim 3, wherein said activator is a hydraulic cylinder.

5. The lateral load tire testing system of claim 2, wherein said tire support assembly is supported on a sub-frame; and
said sub-frame being rotatable about a pivot axis to camber the tire relative to said load assembly.

6. The lateral load tire testing system of claim 2, wherein each of said load cells is respectively located between a first support and a second support.

7. The lateral load tire testing system of claim 2 further comprising at least one spacer insertable between one of said load cells and one of said supports, said spacer having a selected thickness adapted to calibrate said load cell.

8. The lateral load tire testing system of claim 2, wherein said load assembly includes a rotatable load wheel.

9. The lateral load tire testing system of claim 2 further comprising a junction box in electrical communication with each of said load cells and also is in communication with a controller, wherein said junction box includes a plurality of switches corresponding to said load cells, said switches being adapted to selectively transmit signals from said load cells to said controller.

10. The lateral load tire testing system of claim 8, wherein said junction box is adapted to combine said signals from said load cells and transmit a single signal to said controller.

11. A method of measuring lateral loads on a tire comprising:
providing a load assembly and a spindle located adjacent to said load assembly, said spindle being adapted to rotatably support said tire and selectively engage said tire with said load wheel;
supporting said spindle in a spindle housing that is attached to a spindle frame yet movable axially relative thereto; and
coupling a load cell to said spindle housing and spindle frame measuring axial loads generated by movement of said spindle housing relative to said spindle frame to determine lateral forces on the tire wherein said measuring step includes coupling a load cell between said spindle housing and said spindle frame to monitor relative movement therebetween.

12. A method of measuring lateral loads on a tire comprising:
providing a load assembly and a spindle located adjacent to said load assembly, said spindle being adapted to rotatably support said tire and selectively engage said tire with said load wheel;
supporting said spindle in a spindle housing that is attached to a spindle frame yet movable axially relative thereto;
coupling a load cell to said spindle housing and spindle frame measuring axial loads generated by movement of said spindle housing relative to said spindle frame to determine lateral forces on the tire; and
before measuring lateral forces, calibrating said load cell, wherein the step of calibrating includes applying a given load to said spindle and inserting a spacer having a selected thickness between either of said spindle frame and spindle housing and said load cell to cause said load cell to display said given load.

* * * * *